(12) United States Patent
Kim (10) Patent No.: US 9,037,327 B2
(45) Date of Patent: May 19, 2015

(54) DISTANCE TO EMPTY CALCULATION METHOD FOR ELECTRIC VEHICLE

(75) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 346 days.

(21) Appl. No.: 13/590,322

(22) Filed: Aug. 21, 2012

(65) Prior Publication Data

US 2013/0311016 A1   Nov. 21, 2013

(30) Foreign Application Priority Data

May 21, 2012  (KR) .......... 10-2012-0053822

(51) Int. Cl.
| | |
|---|---|
| *G06F 17/00* | (2006.01) |
| *B60W 20/00* | (2006.01) |
| *B60W 40/00* | (2006.01) |
| *B60L 11/18* | (2006.01) |
| *B60W 30/18* | (2012.01) |
| *B60W 40/12* | (2012.01) |
| *G07C 5/08* | (2006.01) |

(52) U.S. Cl.
CPC ............ *B60W 30/18* (2013.01); *B60L 11/1862* (2013.01); *B60L 2200/10* (2013.01); *B60L 2200/18* (2013.01); *B60L 2200/32* (2013.01); *B60L 2200/36* (2013.01); *B60L 2240/545* (2013.01); *B60L 2240/547* (2013.01); *B60L 2240/549* (2013.01); *B60L 2250/10* (2013.01); *B60L 2250/16* (2013.01); *B60L 2260/52* (2013.01); *B60L 2260/54* (2013.01); *B60W 40/12* (2013.01); *G07C 5/08* (2013.01); *Y02T 10/7005* (2013.01); *Y02T 10/7044* (2013.01); *Y02T 10/705* (2013.01)

(58) Field of Classification Search
None
See application file for complete search history.

(56) References Cited

U.S. PATENT DOCUMENTS

| | | | |
|---|---|---|---|
| 6,986,688 B1 * | 1/2006 | Jansen ............................ 440/1 |
| 8,406,948 B2 * | 3/2013 | Wang et al. ................... 701/22 |
| 8,521,408 B2 * | 8/2013 | Cho et al. .................... 701/123 |
| 8,666,576 B2 * | 3/2014 | Kim ............................. 701/22 |
| 8,798,831 B2 * | 8/2014 | Cho et al. ..................... 701/22 |
| 2011/0166810 A1* | 7/2011 | Grider et al. .................. 702/63 |
| 2012/0143413 A1* | 6/2012 | Cho et al. ..................... 701/22 |

(Continued)

FOREIGN PATENT DOCUMENTS

| | | | |
|---|---|---|---|
| JP | 2009201197 A | 9/2009 |
| JP | 2010000884 A | 1/2010 |

(Continued)

*Primary Examiner* — James Trammell
*Assistant Examiner* — Demetra Smith-Stewart
(74) *Attorney, Agent, or Firm* — Mintz Levin Cohn Ferris Glovsky and Popeo, P.C.; Peter F. Corless (57) ABSTRACT

Disclosed is a Distance to Empty (DTE) calculation method for an electric vehicle, and more particularly, a DTE calculation method for an electric vehicle that provides a more accurate DTE calculation by estimating remaining available energy of an actual battery and using the estimated remaining available energy for calculation. The DTE calculation method includes obtaining a battery's initial available energy, calculating a battery's accumulative consumption energy consumed while driving a current accumulative driving distance, calculating a battery's remaining available energy from the initial available energy and the accumulative consumption energy, calculating a final fuel efficiency corresponding to driving the current accumulative driving distance, and calculating a DTE from the final fuel efficiency and the remaining available energy.

11 Claims, 4 Drawing Sheets

(56) References Cited

U.S. PATENT DOCUMENTS

| | | | |
|---|---|---|---|
| 2012/0143435 A1* | 6/2012 | Cho et al. | 701/33.4 |
| 2012/0176231 A1* | 7/2012 | Skaff et al. | 340/439 |
| 2012/0179395 A1* | 7/2012 | Gilman et al. | 702/61 |
| 2012/0179420 A1* | 7/2012 | Gilman et al. | 702/165 |
| 2013/0073113 A1* | 3/2013 | Wang et al. | 701/1 |
| 2013/0253740 A1* | 9/2013 | Kim | 701/22 |

FOREIGN PATENT DOCUMENTS

| | | |
|---|---|---|
| JP | 2011095209 A | 5/2011 |
| KR | 10-2006-0020307 | 3/2006 |
| KR | 10-1091664 | 12/2011 |

* cited by examiner

DISTANCE TO EMPTY CALCULATION METHOD FOR ELECTRIC VEHICLE

CROSS-REFERENCE TO RELATED APPLICATION

This application claims under 35 U.S.C. §119(a) the benefit of Korean Patent Application No. 10-2012-0053822 filed on May 21, 2012, the entire contents of which are incorporated herein by reference.

BACKGROUND (a) Technical Field

The present disclosure relates to a Distance to Empty (DTE) calculation method for an electric vehicle. More particularly, it relates to a method by which a more accurate DTE calculation is provided by estimating the remaining available energy of the battery in the electric vehicle and using the estimated remaining available energy for calculating the DTE.

(b) Background Art

As is well known, electric vehicles are powered by motors driven via electricity charged in a battery.

In electric vehicles, it is very important to check a battery state such as the current temperature of the battery, the State of Charge (SOC) of the battery, etc., and to manage the battery state so as to maintain a predetermined level or higher. One of the reasons for checking and managing the battery state is to monitor the SOC of the battery in real time to inform a driver of a Distance to Empty (DTE) corresponding to the remaining capacity of the battery during driving.

In internal combustion engine vehicles, a driver is informed of a DTE estimated from the current fuel state. Similarly, in electric vehicles, a DTE (remaining driving distance) corresponding to the remaining capacity of the battery is estimated from the current battery energy state. This DTE may then is displayed on an instrument cluster (which typically contains gauges such as a speedometer, tachometer, odometer and fuel gauge, and indicators such as gearshift position, seat belt warning light, parking-brake-engagement warning light, and an engine-malfunction light) or the like.

A conventional DTE calculation method for an electric vehicle estimates a DTE by using a relationship between the SOC (%), which is the remaining energy in a high-voltage battery, and the energy consumption rate per distance.

Figure 1:
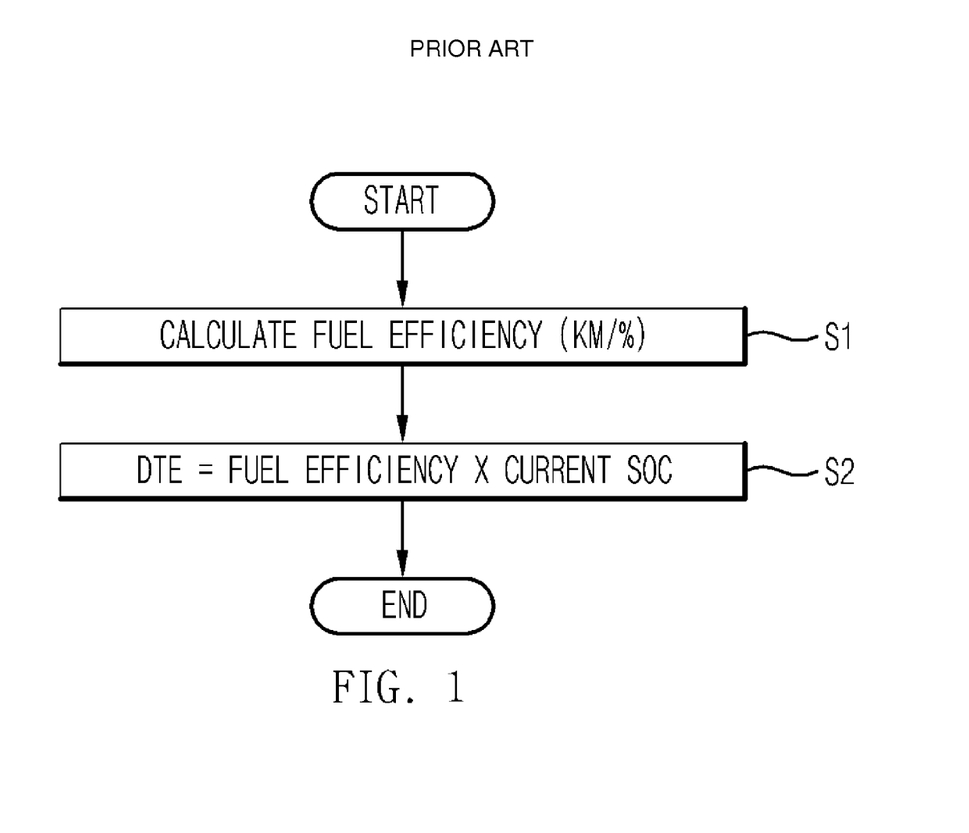
FIG. 1 is a flowchart showing a conventional DTE calculation process.

FIG. 1 is a flowchart showing a conventional DTE calculation process. Referring to FIG. 1, the conventional DTE calculation process will be described.

The conventional DTE calculation method includes calculating a final fuel efficiency (S1) and calculating a DTE from the calculated final fuel efficiency (S2). More specifically, the conventional DTE calculation method includes calculating a past driving average fuel efficiency (km/%), calculating a current driving accumulative fuel efficiency (km/%), calculating a current driving section average fuel efficiency (km/%), calculating an official fuel efficiency (km/%) (or an authorized fuel efficiency, which is a value calculated and input in a fuel efficiency test mode corresponding to a vehicle model). Then, a final fuel efficiency is calculated by blending the past driving average fuel efficiency, the current driving accumulative fuel efficiency, the current driving section average fuel efficiency, and the official fuel efficiency. The DTE is then calculated from the calculated final fuel efficiency.

In this method, the past driving average fuel efficiency is calculated by averaging the fuel efficiencies of n past driving cycles (i.e., the interval from previous charging to next charging is defined as one driving cycle). The fuel efficiency (km/%) is calculated and stored at the end of every driving cycle (i.e., the previous driving cycle is finished when charging is initiated), and then the stored fuel efficiencies of the cycles are averaged.

In this case, the fuel efficiency (km/%) of the driving cycle is expressed as accumulative driving distance during a driving cycle (km)/$\Delta$SOC(%), where $\Delta$SOC(%)=SOC(%) immediately after previous charging−SOC(%) just before current charging.

The current driving accumulative fuel efficiency (km/%) is a fuel efficiency of the current driving cycle after charging.

The current driving section average fuel efficiency (km/%) is calculated by averaging the fuel efficiencies of n particular-sections of driving, in which the fuel efficiency is calculated and stored for every driving distance of a particular section and the stored fuel efficiencies are averaged.

When the final fuel efficiency is calculated, a DTE is calculated based on the final fuel efficiency and then displayed on the cluster or the like. In this case, a DTE (km) is calculated as 'final fuel efficiency (km/%)×current SOC (%)'.

As such, in calculating a DTE of an electric vehicle according to the conventional method, the battery SOC is needed. More specifically, when the fuel efficiency of a past driving cycle is calculated, the total battery consumption (corresponding to the above $\Delta$SOC) during cycles is reflected.

However, the conventional DTE calculation method calculates a DTE assuming that a battery SOC level is an available energy level. Thus, an error occurs in the DTE calculation because a value corresponding to a gas mileage (km/%) of an internal engine is used as a fuel efficiency (km/%).

In practice, since the battery SOC change and the battery available energy change are not the same, an error occurs in the DTE calculation as the correlation between the battery SOC change and the battery available energy change is reduced.

Therefore, additional compensation is required. However, the conventional DTE calculation method does not perform a correction with respect to the battery temperature and the battery electric current pattern (the vehicle driving pattern and the electric current pattern are the same as each other), resulting in further degradation of DTE calculation accuracy.

For example, when comparing driving at −10° C. with driving at 20° C., corresponding actual DTEs are different from each other.

Further, the battery SOC is a normalized value of an accumulative value of the amount of electric charge (an electric current value is calculated by integration). Thus, the battery SOC cannot accurately express the remaining available energy of the battery (the current battery available energy).

Moreover, a drop of the battery voltage occurs according to the electric current size and temperature of the battery, and a change in available energy occurs, such that accuracy is degraded in the DTE calculation based on the battery SOC (%).

SUMMARY OF THE DISCLOSURE

The present invention has been made in an effort to solve the above-described problems associated with prior art, and provides an improved DTE calculation method for an electric vehicle. More particularly, a DTE calculation method for an electric vehicle is provided which obtains an available energy of a battery corresponding to a representative current pattern (current pattern having high incidence frequency) per battery temperature, and a battery SOC. These available energy of the battery and battery SOC are obtained through a test that takes into consideration conditions affecting the remaining available energy of the actual battery being used, and the available energy of the actual battery that remains after current accumulative-driving distance driving is calculated. In particular, an initial available energy of the battery is obtained from an initial available energy map of the battery that is generated using obtained test data. According to the present method, accuracy of the DTE calculation is improved.

In one aspect, the present invention provides a DTE calculation method for an electric vehicle, which includes obtaining a battery's initial available energy, calculating a battery's accumulative consumption energy consumed while driving a current accumulative driving distance, calculating a battery's remaining available energy from the initial available energy and the accumulative consumption energy values, calculating a final fuel efficiency corresponding to driving of a current accumulative driving distance, and calculating a DTE from the final fuel efficiency and the remaining available energy.

According to various embodiments, the battery's accumulative consumption energy consumed while driving the current accumulative driving distance includes an accumulative consumption energy that is used by the vehicle while driving the current accumulative driving distance after charging.

According to various embodiments, the step of obtaining of the battery's initial available energy includes obtaining the battery's initial available energy from a map of a battery management system by using an initial battery temperature and an initial battery State of Charge (SOC) after charging.

According to various embodiments, the step of calculating the battery's accumulative consumption energy includes summing power values that are calculated using current and voltage values of the battery while driving an accumulative driving distance after battery charging. According to various embodiments, the accumulative consumption energy is mathematically calculated by integration.

According to various embodiments, the battery's accumulative consumption energy is reset to '0' when the battery's initial available energy is updated.

According to various embodiments, the calculation of the battery's remaining available energy includes subtracting the battery's accumulative consumption energy from a recently updated initial available energy of the battery.

According to various embodiments, in cases in which ignition (IG) is OFF and then IG is ON, on completion of battery charging, and on updating of a storing means of a battery management system, the battery's initial available energy is data obtained from a map by using the battery temperature and the battery SOC in a state of Ignition (IG) ON when the battery temperature stored in IG OFF and the battery temperature in IG ON has a difference therebetween of more than a predetermined value.

According to various embodiments, the battery's initial available energy immediately before IG OFF is identical to that used in another IG ON when the battery temperature in IG OFF and the battery temperature the other IG ON are the same or have a difference therebetween of less than a predetermined value.

According to various embodiments, the calculation of the final fuel efficiency includes calculating a past driving average fuel efficiency, calculating a current driving accumulative fuel efficiency, and calculating a current driving section average fuel efficiency; blending the calculated values for the past driving average fuel efficiency, the current driving accumulative fuel efficiency, and the current driving section average fuel efficiency; calculating a fuel efficiency corresponding to a current power consumed in an air conditioner; and calculating a final fuel efficiency from the driving fuel efficiency obtained by blending of the calculated values and the calculated fuel efficiency corresponding to the power consumed in the air conditioner.

According to various embodiments, the calculation of the current driving section average fuel efficiency includes calculating an average fuel efficiency of driving sections by applying a weighted averaging scheme which applies weight values to fuel efficiencies of the respective driving sections and averages the weighted fuel efficiencies.

According to various embodiments, the final fuel efficiency is obtained by subtracting the fuel efficiency corresponding to the power consumed in the air conditioner from the driving fuel efficiency obtained by the blending.

Other aspects and preferred embodiments of the invention are discussed infra.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings to allow those of ordinary skill in the art to easily carry out the present invention. While the invention will be described in conjunction with the exemplary embodiment, it will be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to the accompanying drawings.

The present invention relates to a Distance to Empty (DTE) calculation method for an electric vehicle, in which the remaining available energy of the actual battery is used, and the DTE is calculated based on the energy of the actual available battery (i.e. wherein the "actual battery" and "the available battery" and similar terms refer to the battery in the electric vehicle).

More specifically, by using the initial available energy of the battery obtained based on test data, the remaining available energy (kWh) of the actual battery is calculated. Further, an accurate fuel efficiency (km/kWh) is calculated as a physical quantity corresponding to a gas mileage of an internal engine based on an energy value, thereby achieving more accurate DTE calculation.

Figure 2:
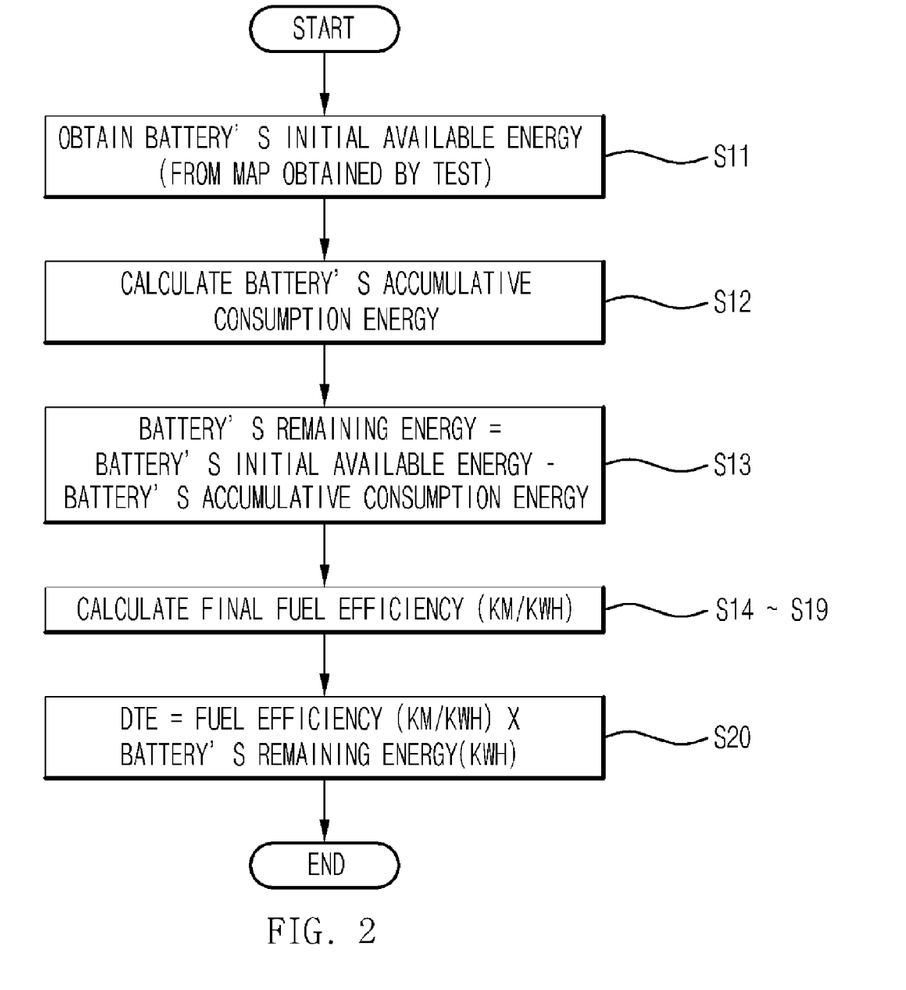
FIG. 2 is a flowchart showing a DTE calculation process according to an embodiment of the present invention.

As shown in FIG. 2, a DTE calculation process according to the present invention includes a process of obtaining an initial available energy of a battery (S11), a process of calculating an accumulative consumption energy of the battery (S12), a process of calculating a remaining available energy (remaining energy) of the battery by using the initial available energy and the accumulative consumption energy, a processes of calculating a final fuel efficiency (S14-S19), and a process of calculating a DTE from the final fuel efficiency (S20).

Herein, the processes of calculating the final fuel efficiency (S14-S19) includes a process of calculating a past driving average fuel efficiency (S14), a process of calculating a current driving accumulative fuel efficiency (S15), a process of calculating a current driving section average fuel efficiency (S16), a process of blending (S17) the past driving average fuel efficiency, the current driving accumulative fuel efficiency, and the current driving section average fuel efficiency, a process of calculating a fuel efficiency corresponding to current power consumed in the air conditioner (S18), and a process of calculating the final fuel efficiency from a fuel efficiency obtained by the blending (S17) and a fuel efficiency corresponding to the power consumed in the air conditioner (S19).

In the present invention, a controller (not shown) having operation blocks for executing and controlling the calculation processes in the respective processes and for controlling a storing means is provided. According to embodiments of the present invention, a finally calculated DTE is displayed on a cluster, and the controller may be a trip computer of a vehicle or a separate controller which calculates a DTE and transmits the calculated DTE to the trip computer.

The controller is configured to obtain the initial available energy of the battery from test data derived taking into consideration conditions affecting the actually available battery energy. As such, the controller is provided to receive the battery's initial available energy information from a battery management system as well as information such as on/off signals and operating state of an air conditioner, etc., from an air conditioning controller.

Figure 3:
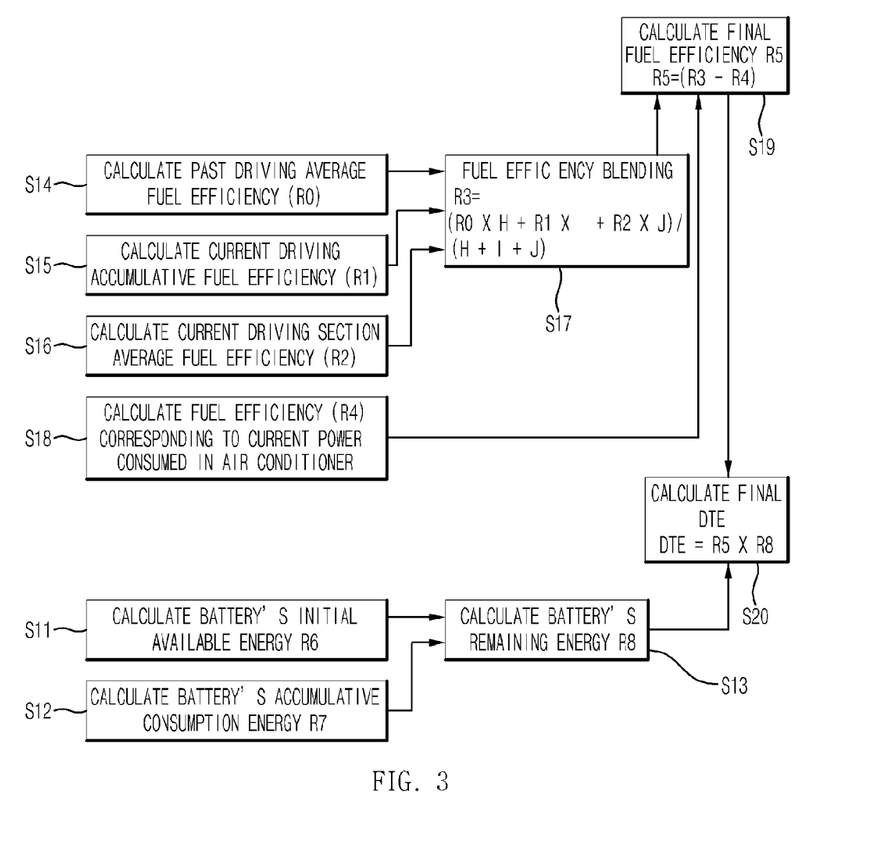
FIG. 3 is a block flowchart showing a calculation method in each step in DTE calculation according to an embodiment of the present invention.

Hereinafter, the respective calculation processes shown in FIG. 2 will be described in more detail with reference to FIG. 3.

Battery's Initial Available Energy Calculation (S11)

Batteries of electric vehicles experience different voltage drops according to their electric current patterns. As such, that even when batteries use the same power, available energies may differ from battery to battery.

In addition, a battery may have different available energies depending upon factors such as temperature, deterioration degree, etc., as well as the electric current pattern.

Therefore, according to the present invention, the battery's electric current pattern (driving pattern) having high incidence frequency is first selected according to a deterioration degree level of the battery. The selection of the battery's electric current pattern may be achieved by selecting an electric current pattern having a relatively high incidence frequency, such as an authorization test mode, like an Urban Dynamometer Driving Schedule (UDDS), a constant-speed driving mode, etc.

For each electric current pattern of the battery selected as described above, an available energy corresponding to an initial battery temperature after battery charging and an initial battery SOC is measured and secured by a test.

In this case, test conditions are a vehicle soak temperature and a start SOC of the battery.

According to an exemplary embodiment, the soak temperature has an interval of 10° C. ranging from −30° C. to 30° C., and a start SOC has an interval of 10% ranging between 90-10%. As such, by the test based on each electric current pattern, an available battery energy for each soaking temperature and start SOC is measured and secured. According to various embodiments, a battery energy available at the start SOC of 5% is also tested, measured, and secured.

After available battery energy data corresponding to each sock temperature and start SOC is obtained, the obtained data is averaged according to each electric current pattern to calculate an average value, and the average value is applied as a battery's initial available energy during driving after battery charging.

For example, in case of a soak temperature of −30° C. and a start SOC of 80%, an average value of available battery energy values corresponding to respective electric current patterns (selected electric current pattern) is applied as a battery's initial available energy during driving (when the initial battery temperature is 30° C. and the initial battery SOC is 80% after charging).

That is, an average value calculated by averaging available energy corresponding to each electric current pattern is used as the initial available energy of the battery.

By using the obtained available energy data (test data), a battery's initial available energy map ('map' for short) is configured in the storing means of the battery management system.

Figure 4:
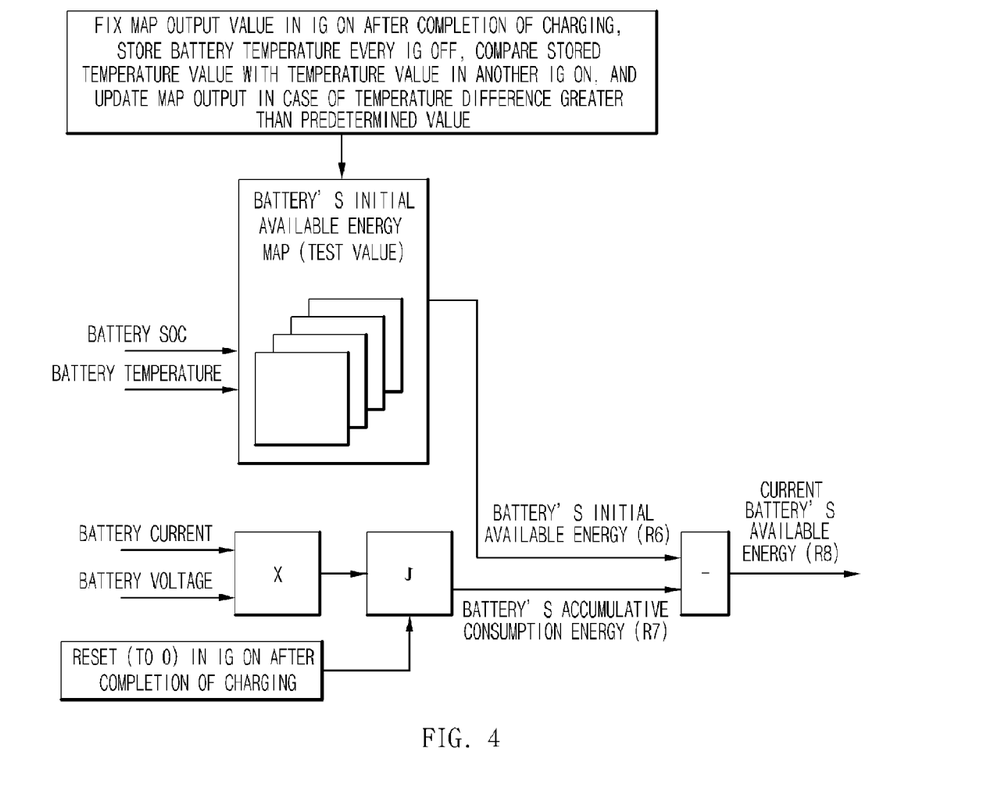
FIG. 4 is a block flowchart showing a calculation method for a remaining available energy of a battery in DTE calculation according to an embodiment of the present invention.

The battery management system checks data of the map with input values of the initial battery SOC and the initial battery temperature, thus providing the battery's initial available energy (map data) corresponding to conditions (initial battery SOC and initial battery temperature) as an output value to the controller (see FIG. 4).

Herein, the battery management system fixes the map data (output value) in Ignition (IG) ON after completion of battery charging and stores the current temperature of the battery at every IG OFF. Battery temperature in another IG ON after IG OFF is compared with battery temperature in the IG OFF. If a difference therebetween is greater than a predetermined value, an output value of the map is updated to an available energy corresponding to the temperature value in the current time (IG ON).

That is, if the battery temperature stored in IG OFF and the battery temperature in the current time (IG ON) has a difference greater than the predetermined value, map data (battery's initial available energy) corresponding to the battery temperature and the battery SOC in the current time (IG ON) is obtained from the map, thus updating the battery's initial available energy.

The available battery energy data continuously changes according to battery temperature that changes during a test from an initial temperature. Thus, the battery temperature is stored in IG OFF and is compared with the battery temperature in another IG ON. If a difference therebetween is not greater than the predetermined value, then available energy data in IG OFF and available energy data in another IG ON are assumed to be single continuous data, such that an output value of the map (initial available energy of the battery) is not updated. Thus, in another IG ON, a battery's initial available energy R6 immediately before IG OFF is identically applied.

That is, as the battery's initial available energy R6, test data applied in IG ON is identically applied in IG OFF, and if the battery temperature in another IG ON is the same as the battery temperature stored in immediately previous IG OFF or has a difference within a predetermined range, the battery's initial available energy immediate-previous IG OFF is identically used without an update.

For example, if map data (battery's initial available energy) 1 is 10 kWh when the initial battery temperature is −20° C. and the initial battery SOC is 80%, and map data 2 is 6 kWh when the initial battery temperature is 10° C. and the initial battery SOC is 50%, if a vehicle is left for a predetermined time after the battery is charged by a charger up to SOC 80%, and then in IG ON, if the battery temperature is −20° C., then the battery's initial available energy is 10 kWh. When the battery SOC is 50% and the battery temperature is 20° C. after driving a predetermined distance, the battery temperature (20° C.) in IG OFF is stored.

In another IG ON for driving, if the battery temperature is 20° C., the battery's initial available energy maintains the previous value (10 kWh) (in the immediately previous IG OFF). If the battery temperature is 10° C. in another IG ON (a temperature difference greater than a predetermined value is generated when compared to immediate previous IG OFF), then the battery's initial available energy is updated and changed to 6 kWh, which is the value of the map data 2.

Battery's Accumulative Consumption Energy Calculation (S12)

By summing up powers, calculated by multiplying a current battery electric current value and a current battery voltage value at predetermined time intervals while driving an accumulated driving distance after battery charging, a battery's accumulative consumption energy R7 is calculated by integration.

The calculated battery's accumulative consumption energy R7 is reset to '0' if a difference between the battery temperature stored in IG OFF and the current battery temperature (in IG ON) is greater than a predetermined value in a case of IG OFF followed by IG ON; on completion of charging of the battery; or when the battery's initial available energy is updated due to update of the storing means (e.g., ROM or the like) in the battery management system.

Battery's Remaining Available Energy (Remaining Energy) Calculation (S13)

By subtracting the accumulative consumption energy R7 from the battery's initial available energy R6, a battery's remaining available energy (battery's current available energy) R8 is calculated.

Herein, when the battery's initial available energy R6 is updated, the battery's current available energy R8 is calculated by applying the updated battery's initial available energy.

That is, the battery's remaining energy (battery's current available energy) R8 is calculated as 'recently updated battery's initial available energy−battery's accumulative consumption energy R7'.

Thus, in cases of IG OFF followed by IG ON, on completion of charging of the battery, or in updating the storing means of the battery management system, when a difference between the battery temperature stored in IG OFF and the current battery temperature (in IG ON) is greater than a predetermined value, then the battery's initial available energy is updated with map data (battery's initial available energy) corresponding to the battery temperature and the battery SOC in current time (IG ON). Thus, the data obtained from the map is used as the battery's initial available energy R6. In other cases, the battery's initial available energy is held and used.

Next, to calculate a final fuel efficiency R5, the following process is performed.

Past Driving Average Fuel Efficiency Calculation (S14)

A past driving average fuel efficiency R0 (km/kWh) is calculated by averaging fuel efficiencies of past driving cycles (i.e., the interval from previous charging to next charging is defined as one driving cycle). The fuel efficiency (km/kWh) is calculated and stored at the end of every driving cycle (i.e., the previous driving cycle is finished in charging), and then the stored fuel efficiencies of the cycles are averaged.

The fuel efficiency (km/kWh) of a driving cycle is calculated as 'accumulative driving distance (km) of corresponding driving cycle/accumulative consumption energy (kWh) used in vehicle driving of corresponding driving cycle'.

The fuel efficiency calculated as described above is stored in n buffers in the storing means, and when the fuel efficiency of every driving cycle is stored in the n buffers, the oldest fuel efficiency data is deleted as new fuel efficiency data is stored.

An official fuel efficiency (calculated and input through a fuel efficiency test mode corresponding to a vehicle model) is stored in one buffer in the storing means, and by using a fuel efficiency of a corresponding driving cycle and the official fuel efficiency, the past driving average fuel efficiency R0 is calculated.

In fuel efficiency average calculation, a weighted averaging scheme which applies a weight value to each fuel efficiency (in other words, a particular fuel efficiency value contributes to the calculation based on the particular weight value given to that particular fuel efficiency, wherein fuel efficiencies with a larger weight values are taken into greater consideration and, thus, contribute more than fuel efficiencies with smaller weight values) and averages the weighted fuel efficiencies may be applied, for example as Equation (1).

$$R0 = \{A1 \times a[0] + A2 \times a[1] + A3 \times a[2] + \ldots + An \times a[n-1] + B \times b[0]\} / (A1 + A2 + A3 + \ldots An + B) \quad (1)$$

Herein, R0 indicates a past driving average fuel efficiency, A1, A2, A3, An, and B indicate weight values, a[0], a[1], a[2], and a[n−1] indicate fuel efficiencies of respective driving cycles, and b[0] indicates an official fuel efficiency. An "official fuel efficiency" is understood to be a fuel efficiency that is typically provided for display on an exterior tag or label affixed to a vehicle before the vehicle is released from a factory, wherein the efficiency is measured by a government authorized organization, and is usually expressed in km/KWh.

Current Driving Accumulative Fuel Efficiency Calculation (S15)

A current driving accumulative fuel efficiency R1(km/kWh) is calculated from a current accumulative driving distance (km) measured from charging and an accumulative consumption energy used during vehicle driving after charging, as Equation (2).

$$R1 = \text{Current Accumulative Driving Distance (km) after Charging/Accumulative Consumption Energy (kWh) used during Vehicle Driving} \tag{2}$$

Herein, the accumulative consumption energy used in vehicle driving after charging is the aforementioned battery's accumulative consumption energy R7.

In addition, the current accumulative driving distance after charging includes a plurality of driving sections.

Current Driving Section Average Fuel Efficiency Calculation (S16)

A current driving section average fuel efficiency R2 (km/kWh) is calculated by averaging fuel efficiencies of a current driving section (i.e., an interval from IG ON to IG OFF after charging is defined as one driving section). The fuel efficiency (km/kWh) is calculated and stored at the end of every driving section, and then the stored fuel efficiencies of the driving sections averaged.

The fuel efficiency (km/kWh) of the driving section is calculated as 'accumulative driving distance (km) of corresponding driving section/accumulative consumption energy (kWh) used in vehicle driving of corresponding driving section'.

The fuel efficiency calculated as described above is stored in n buffers in the storing means, and when the fuel efficiency of every driving section is stored in the n buffers, the oldest fuel efficiency data is deleted as new fuel efficiency data is stored in a moving averaging scheme, such that an average value corresponding to a relatively short period is calculated during driving of a predetermined section (accumulative driving distance).

While a vehicle is stopped (prior to another IG ON after IG OFF), the fuel efficiency calculation is held (i.e., is not carried out).

In the fuel efficiency average calculation, a weighted averaging scheme which applies a weight value to each fuel efficiency of each driving section and averages the weighted fuel efficiencies may be applied, for example as Equation (3).

$$R2 = \{E1 \times c[0] + E2 \times c[1] + E3 \times c[2] + \ldots + En \times c[n-1]\} / (E1 + E2 + E3 + \ldots En) \tag{3}$$

Herein, R2 indicates a current driving section average fuel efficiency, E1, E2, E3, and En indicate weight values, and c[0], c[1], c[2], and c[n−1] indicate a fuel efficiency of each driving section.

By blending the fuel efficiencies (km/kWh) calculated in the foregoing processes, a fuel efficiency R3 is calculated.

Blending of Past Driving Average Fuel Efficiency, Current Driving Accumulative Fuel Efficiency, and Current Driving Section Average Fuel Efficiency (S17)

The driving fuel efficiency R3 (km/kWh) calculated in the process of blending the past driving average fuel efficiency R0, the current driving accumulative fuel efficiency R1, and the current driving section average fuel efficiency R2 is used to calculate a final fuel efficiency R5 which reflects a current power consumed in the air conditioner.

The driving fuel efficiency R3 obtained by blending the foregoing calculated fuel efficiencies R0, R1, and R2 is an average value of the past driving average fuel efficiency R0, the current driving accumulative fuel efficiency R1, and the current driving section average fuel efficiency R2. In calculation of the average value, a weighted averaging scheme which applies weight values to respective fuel efficiencies and averages the weighted fuel efficiencies may be used as given Equation (4).

$$R3 = (R0 \times H + R1 \times I + R2 \times J)/(H+I+J) \tag{4}$$

Herein, R0, R1, and R2 indicate the fuel efficiencies calculated in the foregoing processes, and H, I, and J indicate weight values.

In the foregoing blending, respective weight values are preferably different from each other, and according to the weight values, the DTE value changes. For example, in case of blending with a large weight value applied to the past driving average fuel efficiency R0, a DTE corresponding to a past driver's tendency is calculated; in case of blending with a large weight value applied to the current driving section average fuel efficiency R2, a DTE will changes promptly in response to a change of the current driving pattern.

Calculation of Fuel Efficiency Corresponding to Current Power Consumed in Air Conditioner (S18)

A process of calculating a fuel efficiency R4 (km/kWh) corresponding to the current power consumed in the air conditioner is a process of calculating a fuel efficiency which can drive a vehicle using power consumed by an air conditioner when a driver operates the air conditioner (the process of converting the power consumed in the air conditioner into a fuel efficiency corresponding to vehicle driving).

The power consumed in the air conditioner may be power consumed by a cooling device (an air-con compressor, etc.) and a heating device (an electric heater, e.g., a PTC heater), and the fuel efficiency corresponding to the power consumed in the air conditioner may be calculated as a table value with input values of the current power consumed in the air conditioner, the calculated driving fuel efficiency R3, and the vehicle's average speed during driving after charging, as Equation (5).

$$R4 = \text{Func(Power Consumed in Cooling Device+Power Consumed in Heating Device+Driving Fuel Efficiency}(R3) + \text{Vehicle's Average Speed in Driving after Charging)} \tag{5}$$

Herein, Func may be implemented as a table and is obtained from a table in which a fuel efficiency value corresponding to a consumed power is predefined.

The process of calculating a final fuel efficiency R5 by using the foregoing calculated R3 and R4 (S19) is performed, and after calculation of the final fuel efficiency R5, a final DTE is calculated from the final fuel efficiency R5 (S20).

Final Fuel Efficiency Calculation (S18) and DTE Calculation (S20)

By subtracting the fuel efficiency R4 corresponding to the current power consumed in the air conditioner from the driving fuel efficiency R3 obtained by blending, the final fuel efficiency R5 (km/kWh) is calculated. Then, the DTE (km) is finally calculated from the final fuel efficiency R5 and the foregoing battery's remaining available energy (current battery's available energy) R8, as given in Equations (6) and (7).

$$R5 = R3 - R4 \tag{6}$$

$$DTE = R5 \times R8 \tag{7}$$

As such, according to the present invention, an accurate fuel efficiency (km/kWh) is calculated based on an energy value, the battery's accumulative consumption energy R7 consumed while driving a current accumulative driving distance after charging is subtracted from the battery's initial available energy R6 which depends on conditions such as the battery temperature, the battery SOC, the electric current pattern, and so forth, such that the battery's remaining available energy (current battery's available energy) R8 is determined and is used in the calculation. As such, a more accurate DTE (km) can be calculated.

Herein, the battery's accumulative consumption energy R7 is a battery energy consumed by driving a current accumulative driving distance after charging, and the battery's remaining available energy R8 is the actual available battery energy remaining after driving the current accumulative driving distance after charging.

With the DTE calculation method for an electric vehicle according to the present invention, the battery's remaining available energy can be accurately estimated according to an environmental change such as the battery temperature, the battery SOC, the electric current pattern, the degree of deterioration, etc., thereby improving fuel efficiency accuracy and, thus, improving the accuracy of DTE calculation.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

While an exemplary embodiment of the present invention has been described in detail, the protection scope of the present invention is not limited to the foregoing embodiment and it will be appreciated by those skilled in the art that various modifications and improvements using the basic concept of the present invention defined in the appended claims are also included in the protection scope of the present invention.

What is claimed is:

1. A Distance to Empty (DTE) calculation method for an electric vehicle, the DTE calculation method comprising:
    obtaining a battery's initial available energy;
    calculating the battery's accumulative consumption energy consumed while driving a current accumulative driving distance;
    calculating the battery's remaining available energy from the initial available energy and the accumulative consumption energy;
    calculating a final fuel efficiency corresponding to driving the current accumulative driving distance; and
    calculating a DTE from the final fuel efficiency and the remaining available energy,
    wherein the DTE is calculated from the following equation:
    DTE (km)=the final fuel efficiency (km/kWh)×the remaining available energy (kWh).

2. The DTE calculation method of claim 1, wherein the step of obtaining the battery's initial available energy comprises obtaining the battery's initial available energy from a map of a battery management system by using an initial battery temperature and an initial battery State of Charge (SOC) after charging.

3. The DTE calculation method of claim 1, wherein the step of calculating the battery's accumulative consumption energy comprises summing power values, wherein the power values are calculated using current battery current and voltage values while driving the accumulative driving distance after battery charging, using integration.

4. The DTE calculation method of claim 1, wherein the battery's accumulative consumption energy is reset to '0' when the battery's initial available energy is updated.

5. The DTE calculation method of claim 1, wherein the step of calculating of the battery's remaining available energy comprises subtracting the battery's accumulative consumption energy from a recently updated battery's initial available energy.

6. The DTE calculation method of claim 1, wherein the battery's initial available energy is data obtained from a map by using the battery temperature and the battery SOC in Ignition (IG) ON when the battery temperature stored in IG OFF and the battery temperature in IG ON has a difference therebetween of more than a predetermined value in case of IG OFF and then IG ON, in case of completion of battery charging, and in a case of updating a storing means of a battery management system.

7. The DTE calculation method of claim 1, wherein the battery's initial available energy immediately before IG OFF is identically used in another IG ON when the battery temperature in IG OFF and the battery temperature in another IG ON are the same as each other or has a difference therebetween of less than a predetermined value.

8. The DTE calculation method of claim 1, wherein the step of calculating the final fuel efficiency comprises:
    calculating a past driving average fuel efficiency; calculating a current driving accumulative fuel efficiency;
    calculating a current driving section average fuel efficiency;
    blending the past driving average fuel efficiency, the current driving accumulative fuel efficiency, and the current driving section average fuel efficiency;
    calculating a fuel efficiency corresponding to a current power consumed in an air conditioner; and
    calculating a final fuel efficiency from the driving fuel efficiency obtained by the blending and the fuel efficiency corresponding to the power consumed in the air conditioner.

9. The DTE calculation method of claim 8, wherein the step of calculating the current driving section average fuel efficiency comprises calculating an average fuel efficiency of driving sections in a fuel efficiency average calculation by applying a weighted averaging scheme which applies weight values to fuel efficiencies of the respective driving sections and averages the weighted fuel efficiencies.

10. The DTE calculation method of claim 8, wherein the final fuel efficiency is obtained by subtracting the fuel efficiency corresponding to the power consumed in the air conditioner from the driving fuel efficiency obtained by the blending.

11. A non-transitory computer readable medium containing program instructions executed by a processor or controller, the computer readable medium comprising:
    program instructions that provide a command to obtain a battery's initial available energy;
    program instructions that provide a command to calculate the battery's accumulative consumption energy;

program instructions that provide a command to calculate the battery's remaining available energy;
program instructions that provide a command to calculate a final fuel efficiency; and
program instructions that provide a command to calculate a DTE from the final fuel efficiency and the remaining available energy, wherein the DTE is calculated from the following equation:
DTE (km)=the final fuel efficiency (km/kWh)×the remaining available energy (kWh).

* * * * *